United States Patent [19]

Abdel-Monem

[11] 4,021,569

[45] May 3, 1977

[54] METHOD OF NUTRITIONAL SUPPLEMENTATION FOR ZINC AND METHIONINE BY INGESTING 1:1 ZINC METHIONINE COMPLEXES

[75] Inventor: Mahmoud M. Abdel-Monem, St. Paul, Minn.

[73] Assignee: Zinpro Corporation, Chaska, Minn.

[22] Filed: Feb. 11, 1976

[21] Appl. No.: 657,189

Related U.S. Application Data

[63] Continuation-in-part of Ser. No. 390,080, Aug. 20, 1973, Pat. No. 3,941,818.

[52] U.S. Cl. .................................. 424/289; 424/319
[51] Int. Cl.² ....................................... A61K 31/315
[58] Field of Search ............................ 424/289, 319

[56] References Cited

UNITED STATES PATENTS

| | | | |
|---|---|---|---|
| 3,647,834 | 3/1972 | Martin | 260/429.9 |
| 3,941,818 | 3/1976 | Abdel-Monem | 260/429.9 |

OTHER PUBLICATIONS

Chemical Abstracts 50:12885c (1963).
J.A.C.S. vol. 77, pp. 5225–5228 (1955).

*Primary Examiner*—Leonard Schenkman
*Attorney, Agent, or Firm*—Zarley, McKee, Thomte, Voorhees & Sease

[57] ABSTRACT

1:1 Zinc methionine complex salts having the formula

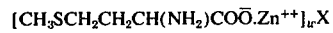

wherein X is an anion and w is an integer equal to the anionic charge of X. These are useful nutritional supplements, both for animals and humans, in that they provide a readily-available source of the zinc ions necessary for dietary balance and provide methionine, an essential amino acid, in a form which provides for body conversion of more of the methionine to protein than does the simple feeding of the compound methionine.

5 Claims, No Drawings

METHOD OF NUTRITIONAL SUPPLEMENTATION FOR ZINC AND METHIONINE BY INGESTING 1:1 ZINC METHIONINE COMPLEXES

CROSS REFERENCE TO A RELATED APPLICATION

This application is a continuation-in-part of application Ser. No. 390,080 filed Aug. 20, 1973, and entitled 1:1 ZINC METHIONINE COMPLEXES now U.S. Pat. No. 3,941,818 issued Mar. 2, 1976.

BACKGROUND OF THE INVENTION

The importance of an adequate supply of zinc to the diet of both animals and humans has long been reported in the literature. Adequate dietary intake of zinc for swine, cattle, and poultry has been known for some time to be of importance. For example, when these animals do not have a sufficient level of zinc ions in the diet, the animals may well develop skin conditions showing noted zinc deficiencies. For example, the skin may become scaly and inflamed. In addition, it has been reported in the literature that animals fed a diet deficient in zinc may tend to develop congenital anomalies and fibrotic changes in the esophagus. Additionally, and very importantly, an adequate level of zinc in the diets of swine, poultry, and cattle has been shown as important for healthy growth of the animals and increased weight gain.

With regard to humans, zinc deficiencies have been reported as possibly tied to arteriosclerosis, the proper growth and functioning of sex organs, and the ability of skin wounds to heal fast and properly.

While the importance of an adequate zinc level in the diet of both animals and humans has been known and reported for some time, maintenance of adequate zinc levels in the dietary intake has not necessarily been easy to achieve. Moreover, dietary supplementation by utilization of conventional salts of zinc, such as zinc chloride, seems to be inadequate. This is so because the zinc exists in a form which is not readily absorbed from the gastrointestinal tract and therefore may not be distributed and utilized effectively in the body.

Methionine, of course, is an essential amino acid needed in the building of body protein and thus critically needed for proper growth of man and other animals.

Accordingly, it is an object of this invention to provide novel zinc compounds wherein the zinc is in a form which can be readily absorbed after ingestion by animals and readily distributed and utilized in order to provide adequate zinc levels for proper health, weight gain, and dietary balance of animals.

Another object of this invention is to provide a method of increasing the body uptake and use of methionine by ingesting 1:1 zinc methionine complexes with the body utilizing a greater proportion of the methionine in protein building than it uses when the compound methionine per se is utilized for nutritional supplementation.

Yet, another object of this invention is to provide a process for making novel zinc compounds which is simple to perform and can be economically utilized in large-scale plant practice to prepare the novel zinc compounds of this invention in bulk for ready utilization in large quantities to supplement the diets of animals and humans.

The method of accomplishing these and other objects will become apparent from the following description of the invention.

SUMMARY OF THE INVENTION

This invention relates to the preparation of novel zinc compounds. The novel zinc compounds have the formula:

wherein X is an anion and W is an integer equal to the anionic charge of X. These compounds all contain a 1:1 ration complex of zinc and methionine as the cation. Such compounds, it is believed because of a complex formed between the zinc and methionine, are in a form which can be readily absorbed, distributed, and utilized within the biochemical system of animals and humans. They function as a readily-available source of zinc and methionine for dietary supplementation.

The invention also relates to a new, simple, and economically feasible process for making the above-described compounds.

DETAILED DESCRIPTION OF THE INVENTION

It is important to note that the compounds of this invention are referred to herein as "zinc methionine complexed salts." These salts are to be carefully distinguished from conventional salts such as, for example, zinc sulphate and zinc chloride, which contain only an electrostatic attraction between the cation and the anion. The complexed salts of this invention differ from conventional salts in that while they have an electrostatic attraction between the cation and the anion, there is also a coordination bond formed between the zinc and the amino moiety of the amino acid methionine. The zinc methionine complexed salts have the formula:

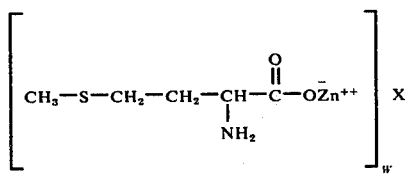

wherein X is an anion and w is an integer equal to the anionic charge of X. The cation of these complexed salts is represented by the bracketed material in the above formula and represents a 1:1 complex of zinc and methionine. Sterically, the cation moiety can be represented as follows:

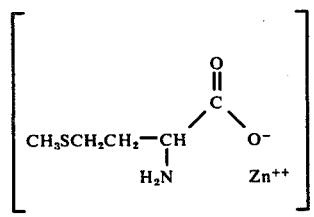

As can be seen from this formula, the five-membered ring formation exists wherein the zinc ion is complexed by coordinate bond with the amine moiety, and electrostatic attraction with the carboxylic acid moiety of the methionine. In addition, the complex is formed by a 1:1 ratio of methionine molecules and zinc ions with each zinc ion becoming complexed with one methionine molecule. Providing 1:1 complex ions of the zinc and methionine has been found of great importance in insuring gastro-intestinal absorption of the zinc and methionine and their subsequent distribution and effective utilization.

In addition, certain of these compounds, and in particular, zinc methionine acid sulphate, and zinc methionine chloride have been found to have some therapeutic effect in the treatment of acne, colitis and other epidermal disorders.

In the above-described formula, X represents the anion. The selection of an anion is not critical. The anion can be an inorganic anion, an organic anion, a monovalent anion, a divalent anion, or a polyvalent anion. However, in order to have the molecules of the salt balanced electrostatically, w is a whole number integer equal to the anionic charge of the anion X.

Preferably, the source of the anion, X, is an inorganic acid. Suitable inorganic anions can be found in the Halogen acids family, the sulphates, and the phosphates. Preferably, where the anion is an inorganic anion, it is selected from the group consisting of monovalent anions, such as halides, hydrogen sulphate, and dihydrogen phosphate. Utilization of monovalent anions selected from the above group is preferred because of the resulting ready solubility of the zinc methionine complexed salts and because of the readily-available sources of common inorganic anions such as the halides, hydrogen sulphate, and dihydrogen phosphate. Most preferably, the anion is selected from the group consisting of chloride and hydrogen sulphate or acid sulphate, the later two terms being utiilzed herein interchangeably.

As heretofore briefly mentioned, the anion can also be an organic anion moiety derived from an organic acid. It can be derived from simple aliphatic carboxyllic acids, both monobasic carboxyllic acids and dibasic carboxyllic acids. For example, the anion can be acetate or propionate, or where the acid is a dibasic acid, succinate or adipate. In addition, the acid source can be substituted aliphatic acids, both monobasic and dibasic, such as, for example, chloroacetic acid. The acid source of the anion may also be aromatic acids such as, for example, benzoic acid. It can also be aralkyl acids, both substituted and unsubstituted.

Where organic acid sources are utilized as the source of the anion for the salts of this invention, it is preferred that the source be a monobasic carboxyllic acid and that the acid be either acetic acid, propionic, or benzoic.

Surprisingly, a simple, straight-forward and, importantly, economicaly feasible process of preparing these zinc methionine complexed salts of this invention in a form readily utilizable for dietary supplementation has been developed. For purposes of clarity of description of the invention and conciseness, the method will be described only with relationship to preparing the two most preferred compounds, zinc methionine acid sulphate and zinc methionine chloride. It should be understood, however, that the method can easily be modified for preparation of other zinc methionine complexed salts such as zinc methionine diacid phosphate, zinc methionine acetate, zinc methionine propionate, zinc methionine benzoate, and the like. Zinc methionine acid sulphate and zinc methionine chloride are the preferred compounds because they can be easily prepared and, importantly, have been found to have special preferred efficacy in dietary ingestion and body distribution and utilization. The method will first be described in connection with the preparation of zinc methionine acid sulphate.

In accord with the process of this invention, zinc sulphate, either in an anhydrous form or in a hydrated form is reacted with methionine at a pH of 7 or less. It is important that the pH be controlled to (6-7.5) either neutral or acid conditions because if the pH is allowed to become basic (greater than 7.5), the resulting product will be a 1:2 salt of methionine and zinc which is insoluble in water. The reactants, zinc sulphate and methionine are used in equimolar quantities. Utilization of equimolar quantities insures complete reaction with a minimum of side reactions, or excess ingredients. It is preferred that the zinc sulphate be hydrated zinc sulphate, in that little water is needed. Where anhydrous zinc sulphate is utilized, it is preferred that a quantity of water be added to the reaction ingredients about equal to the weight of zinc sulphate and methionine.

The product, zinc methionine acid sulfate, can be conveniently obtained from the reaction solution by the addition of an organic solvent such as isopropyl alcohol, acetone or ethyl alcohol. Alternatively, the reaction solution could be dried using conventional drying methods such as hot air oven, spray drying, or freeze drying to provide a white, solid, uniform free flow appearing powdered form of zinc methionine acid sulphate.

The reaction can be carried out under similar conditions of pH, to prepare zinc methionine chloride by substituting zinc chloride as an initial reaction ingredient for the zinc sulphate previously described herein. However, the resulting product is zinc methionine chloride, which is very soluble in water and is obtained as a syrupy concentrated aqueous solution.

An important feature of the 1:1 complexed salts, having zinc methionine complexes as a cation and associated with suitable anions, is that the stability of the zinc methionine complex is such that after absorption, the zinc and methionine can be readily utilized within an animal's body biochemical systems. This is to be contrasted from complexes of zinc and other complexing agents such as ethylenediamine tetraacetic acid. In these cases the stability of the complexes is so great that the zinc is not readily released and is therefore not available for distribution and utilization within the animal's body. In fact, there is a tendency for ethylenediamine tetraacetic acid to "draw" zinc molecules from the body and to complex them with the resulting complex being excreted. Thus, extremely strong coordinate covalent bonds, such as those formed by ethylenediamine tetraacetic acid, can actually enhance zinc deficiency in an animal's body bio-chemical system.

Methionine, of course, is an essential amino acid needed in the building of body protein and thus critically needed for proper growth of man and other animals. It has now been found that 1:1 complexes of zinc and methionine, for some unknown reason, result in body conversion of more of the methionine to protein than does the simple feeding of the compound methionine. And, of course, the important feature for proper diet and growth is not the quantity of methionine fed but the conversion of that methionine to body protein.

Feeding compositions with 1:1 zinc methionine complexes added thus provide enhanced methionine efficiency since more of it is actually used for the desired result, i.e., protein making.

The amount of the complexes employed in the feeding operation is not critical. Even very small amounts provide some benefit. The amount, however, should be sufficient to provide effective supplementation. For animal feed supplements from about 50 to about 500 grams per ton of feed is sufficient. Preferably from about 100 to about 350 grams per ton are employed.

The following examples are offered to further illustrate the product and process of this invention.

EXAMPLE 1

Hydrated zinc sulphate ($ZnSO_4 \cdot 7H_2O$, 28.75g, 0.1 mol) and methionine (14.9g, 0.1 mol) were dissolved in 100 ml of water by the aid of gentle heat. The hot solution was treated with 3,000 ml of acetone, stirred vigorously for 10 minutes and allowed to cool. A white precipitate was formed, filtered and dried. The weight of the precipitate was 31.0 g. The precipitate was analyzed by routine analytical procedures and was found to contain 20.80% zinc and 47.45% methionine. This will reveal a proper ratio of zinc and methionine to indicate a 1:1 ratio, indicating the formation of a 1:1 complex. In addition, the sample was analyzed by infra red analysis and a examination of the absorption peaks indicated the absence of a strong peak at 2100 reciprocal centimeters, which is characteristic of alpha amino acids. In addition, there was a noted absence of the characteristic peaks of methionine itself. The different peak structures of the product from the peak structures of the reactants indicated the formation of a 1:1 complex of zinc and methionine. Finally, the resulting product was titrated with .1 normal sodium hydroxide and the titration curve was compared with a known titration curve for DL methionine and zinc sulphate. The titration curve proved to be different than the titration curve for either zinc sulphate or DL methionine, indicating formation of the complex salt.

EXAMPLE 2

Hydrated zinc sulphate ($ZnSO_4 \cdot 7H_2O$, 57.5 g 0.2 mol) and methionine (29.84 g, 0.2 mol) were mixed thoroughly in an evaporating dish. The mixture was heated on a steam bath to form a paste. Heating was continued for 60 minutes and the paste was transferred into a hot air oven and dried at 90 degrees C. for 20 hours. The resulting product weighed 63.3 g. Quantitative analysis revealed the product was comprised of 20.3% zinc and 46.5% methionine. This indicated a proper ratio of zinc to methionine for a 1:1 complex of zinc methionine. Further analysis by infrared analysis and titration curve analysis indicated the presence of zinc methionine acid sulphate as per the previous example. The product was a dry, free-flowing powder.

While the paste of this example was hot air oven dried, other preparations have been prepared where the resulting solutions were spray-dried in a spray dryer at a temperature of about 400° F. to yield a dry free-flowing powder.

EXAMPLE 3

Zinc chloride (Zn $Cl_2$, 68.0g, 0.5 mol) was dissolved in water (68.0 g) and the solution was heated to 90° C. Methionine (74.6 g, 0.5 mol) was added and the temperature was kept at 90° C. for one hour to provide zinc methionine chloride solution. The product contained 21.2% zinc and 53.9% methionine. Quantitative and instrumental analysis as previously described revealed the presence of a 1:1 complex salt of zinc methionine chloride.

EXAMPLE 4

Methionine (74.6g, 0.5 mol) was dissolved in a 165 ml of 6.08 N hydrochloric acid and zinc oxide (40.65g) was added. The mixture was heated at 90° C. for 1 hour to provide zinc methionine chloride solution. The product contained 19.9% zinc and 44.0% methionine. The presence of zinc methionine chloride was confirmed by quantitative and instrumental analysis.

EXAMPLE 5

Methionine zinc sulfate (6.2 g, 0.05 mol) was dissolved in 100 ml of $H_2O$. The solution was heated to boiling and a solution of barium acetate (5.1 g, 0.05 mol) in 20 ml of water was added dropwise with stirring, a voluminous precipitate was formed. The mixture was treated with a solution of methionine zinc sulfate until no further precipitation of $BaSO_4$ was observed. The solution was boiled for ten minutes and filtered. The filtrate was evaporated to dryness to provide a white powder. The product contained 23.4% zinc ahd 57.7% methionine. Quantitative and instrumental analysis as previously described revealed the presence of zinc methionine acetate.

EXAMPLE 6

Zinc oxide (8.13 gr) was dissolved in a mixture of 48% hydrobromic acid (33.7 gr) and water (15.0 gr.). Methionine (15.0) was added and the solution was heated at 95° C. for 15 minutes. The mixture was evaporated to dryness. The residue was dried in the oven and the product contains 17.2% zinc and 36.7% methionine. Quantitative and instrumental analysis revealed the presence of zinc methionine bromide.

EXAMPLE 7

The effect of 1:1 zinc methionine complexes on the degree of incorporation of radio-labeled methionine in protein was studied in rats. In one experiment 42 male Sprague-Dawely rats, average weight 174.3 grams, were self-fed on a diet of Purina Chow and water. Nineteen animals were randomly selected and each was put under light ether anesthesia and administered a single oral dose of 40 mg/kg of body weight 2-[$^{14}C$]-dl-methionine acid sulfate which had been prepared from 2-[$^{14}C$]-dl-methionine, and was put into metabolism cages.

The remaining 23 rats were put under light ether anesthesia and administered a single oral dose of a mixture of 19.0 mg/kg of 2-[$^{14}C$]-dl-methionine and 10.5 mg/kg zinc oxide, which are amounts of methionine and zinc equivalent to those present in the dose of zinc methionine acid sulfate administered to the first group of rats.

Twenty-four hours later the rats were sacrificed and the livers were immediately removed. The weights of the livers were determined and portions of the livers were accurately weighed, transferred into 30 ml beakers, mixed with four times their weight of water and homogenized with a polytron ultrasonic homogenizer. A one milliliter portion of each of the homogenates was transferred into a separate 150 ml beaker, mixed with one milliliter of 30% hydrogen peroxide and allowed to stand for 30 minutes. A 0.5 ml portion of each solution was transferred into a separate centrifuge tube and treated with two milliliter of 10% trichloroacetic acid solution, mixed well and allowed to stand for thirty minutes. The mixtures were centrifuged and the supernatants were discarded. Each precipitate was dissolved in 2 milliliters of 0.4N potassium hydroxide and the solutions were transferred into counting vials and mixed with 15 milliliter of scintillation cocktail. The radioactivity was measured with a liquid scintillation counter.

The data obtained from the tests described in the immediately proceding paragraph is summarized in the following table.

supplement of zinc and methionine, a diet supplementing effective amount of complexed salts of the formula:

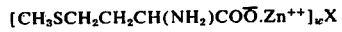

wherein X is an anion which does not interfere with the effective increasing of absorption, distribution and utilization of zinc and methionine within the body system, and w is an integer equal to the anionic charge of X.

2. The method of claim 1 wherein the salt is zinc methionine acid sulphate.

3. The method of claim 1 wherein the salt is zinc methionine chloride.

TABLE I

The incorporation of radioactivity in the liver proteins of rats after the administration of equal amounts of 2-[$^{14}$C]-dl-methionine in the form of zinc [$^{14}$C]-dl-methionine acid sulfate or [$^{14}$C]-dl-methionine.

| | Zinc [$^{14}$C]-dl-methionine acid sulfate group | [$^{14}$C]-dl-methionine group |
|---|---|---|
| Number of animals | 19 | 23 |
| Average weight of rats (S.E.) | 171.5 (3.8) | 177.0 (3.0) |
| Average weight of livers (S.E.) | 7.8 (0.3) | 8.1 (0.3) |
| Average of ratio of liver weight to rat weight, percent (S.E.) | 4.56 (0.14) | 4.54 (0.12) |
| Average cpm*/g liver, (S.E.) | 7.12 × 10$^4$ (4.68 × 10$^3$) | 6.12 (10$^4$ (3.65 × 10$^3$) |
| Average of cpm/liver, (S.E.) | 5.52 × 10$^5$ (2.6 × 10$^4$) 4.85 | × 10$^5$ (2.7 × 10$^4$) |
| Average of percent dose/liver (S.E.) | 0.34 (0.02)$^a$ | 0.29 (0.01) |

*Counts per minute.

The data indicate that rats which received radiolabeled methionine in the form of zinc methhonine sulfate complex converted more of the amino acid methionine to protein in the liver than the rats which received an equivalent amount of the amino acid alone. Thus 1:1 zinc methionine complexes provide a significantly greater body conversion of methionine to protein than is obtained when feeding methionine alone.

What is claimed is:

1. A method of enhancing the nutrition and health of animals and humans by effectively increasing the absorption, distribution and utilization of zinc and methionine within the body system of said animals and humans, said method comprising feeding, as a dietary 4. A dietary animal feed supplement composition comprising a food material and as a dietary supplement of zinc and methionine, complexed salts of the formula:

wherein X is an anion which does not interfere with the effective increasing of absorption, distribution and utilization of zinc and methionine within the body system and w is an integer equal the anionic charge of X, the amount of said complexed salt being a diet supplementing effective amount.

5. The dietary feed supplement composition of claim 4 wherein the amount of said complexed salt is from about 50 to about 500 grams per ton of food material.

* * * * *